Patented Jan. 23, 1951

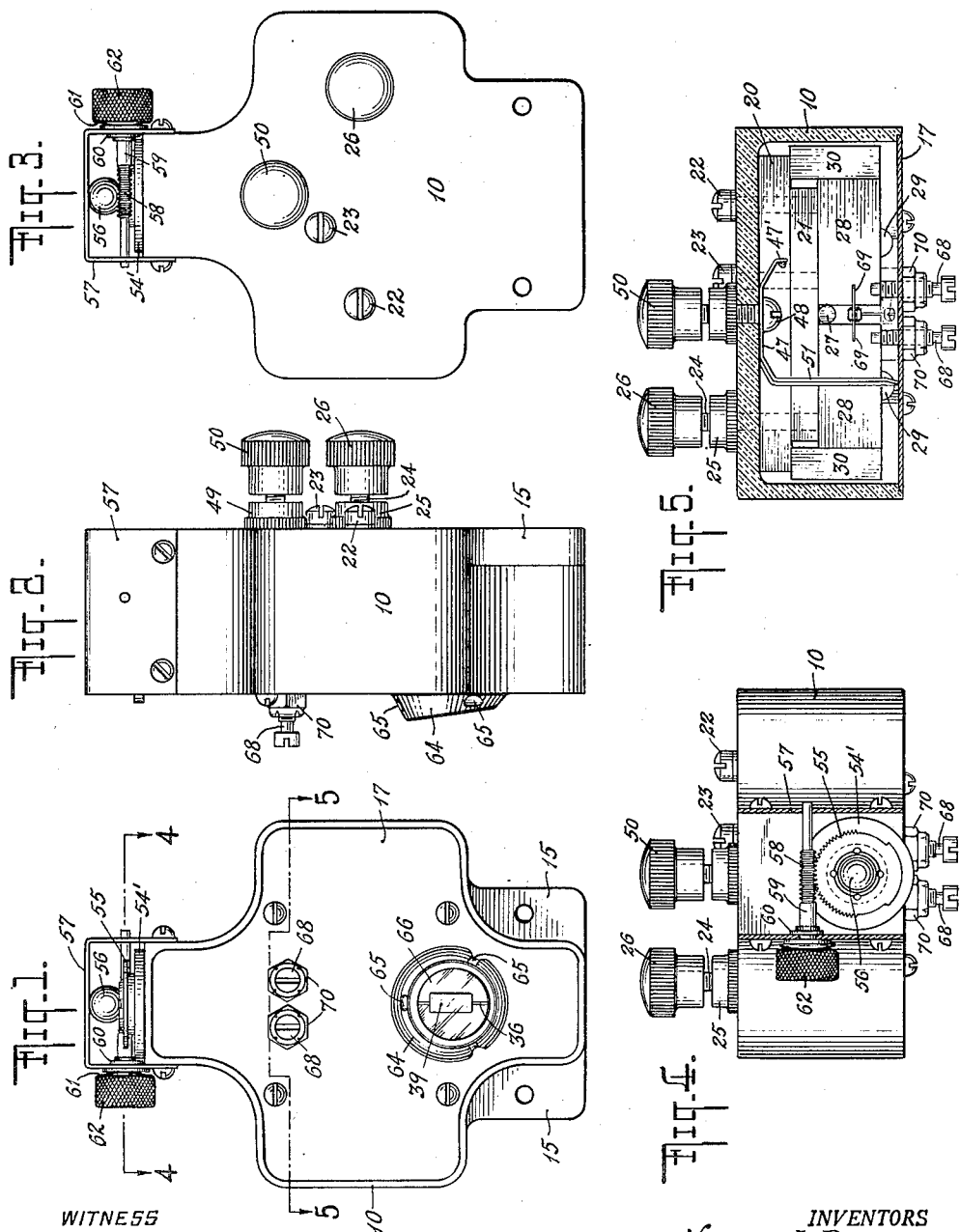

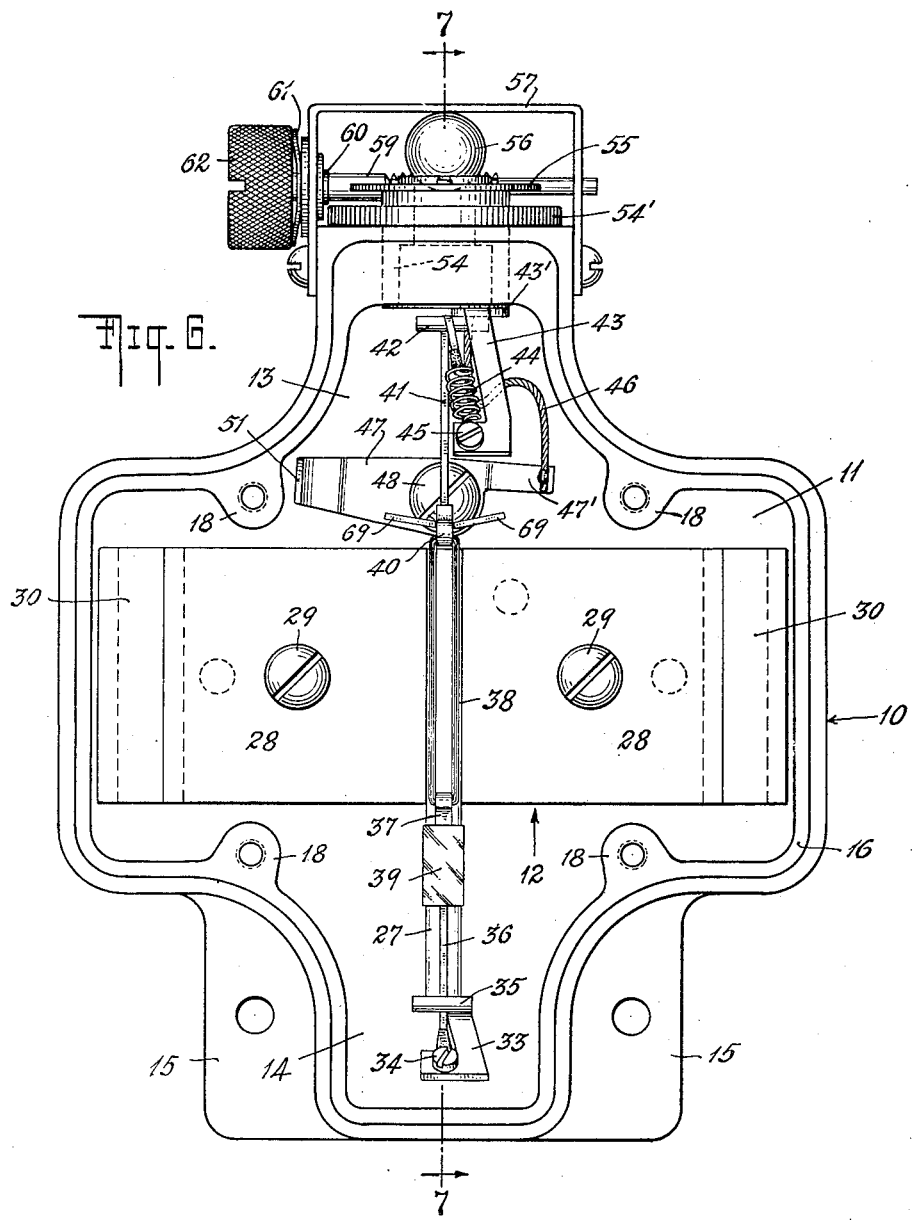

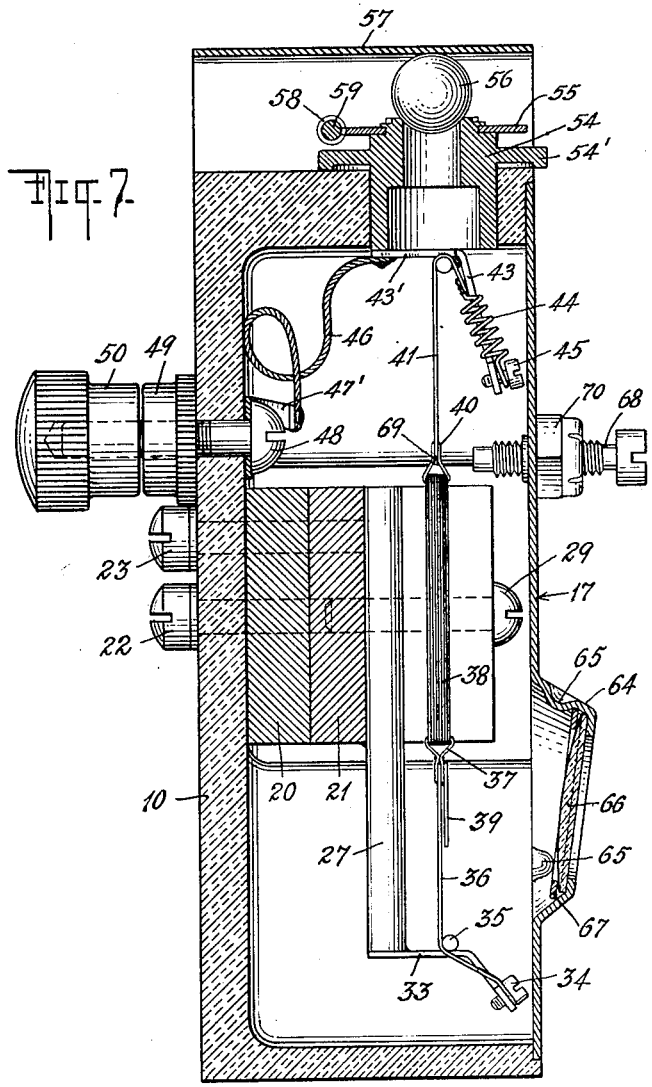

2,539,158

UNITED STATES PATENT OFFICE 2,539,158

GALVANOMETER WITH LAMINATED MAGNETS AND FILAR COIL SUSPENSION

Vozcan L. Parsegian, Brooklyn, and Malcolm Johnson, Jackson Heights, N. Y., assignors, by mesne assignments, to Weston Electrical Instrument Corporation, Newark, N. J., a corporation of New Jersey Application May 7, 1947, Serial No. 746,436

14 Claims. (Cl. 171—95)

1

This invention relates to electrical devices and more particularly to an improved galvanometer construction.

The principal object of the invention is to provide an improved galvanometer construction which will be compact in size, composed of stock size pieces that can be readily replaced and interchanged, and which can be made at a relatively low cost.

A further object of the invention is to provide an improved galvanometer of the moving coil type which will be stable against vibration and shock and will have a relatively fast speed of response.

Another object of the invention is to provide a galvanometer construction which shall be relatively free of temperature gradients.

A still further object of the invention is to provide a new and improved suspension assembly for a moving coil galvanometer.

A still further object of the invention is to provide in a galvanometer an improved assembly of compactly constructed magnets capable of producing high magnetic field intensities.

It is a further object of the invention to provide a new and novel adjustment device for instruments of this type.

Other objects of the invention as well as the novel features of construction thereof will become more apparent from a perusual of the following description when read in connection with the accompanying drawings in which Fig. 1 is a front elevational view of a galvanometer embodying the invention; Fig. 2 is a side elevational view looking toward the right of Fig. 1; Fig. 3 is a rear elevational view of the galvanometer; Fig. 4 is a top plane view of the galvanometer with the top of the zero adjustment housing cut away along line 4—4 of Fig. 1 to show more clearly the construction and arrangement of the zero adjustment mechanism; Fig. 5 is a sectional view taken along the line 5—5 of Fig. 1; Fig. 6 is a front elevational view of the galvanometer on an enlarged scale and with the cover removed to show the construction and arrangement of the interior parts thereof and Fig. 7 is a central vertical sectional view taken along the line 7—7 of Fig. 6.

In the drawings, the reference character 10 indicates generally the galvanometer casing which is preferably made of a material that is electrically non-conductive and has good heat insulating qualities to free the enclosed galvanometer parts as much as possible from temperature gradients. A casing possessing these qualities may be constituted of an integral molded piece of thermoplastic material formed to provide relatively thick walls. The front edge of the casing is provided with a recessed seat 16 adapted to receive the front cover 17 which is secured in position on such seat 16 by four screws that threadedly engage with female threads provided in the ribs 18 formed integrally with the interior walls of the casing 10 (see Fig. 6). Both the casing 10 and cover 17 are formed into a cross-like configuration for purposes of general compactness, ease of handling and mounting and for facilitating the assembly of the galvanometer parts therein. Positioned in the main central chamber 11 of the casing is a magnet which is indicated generally by the referenec numeral 12. The upper central chamber 13 of the casing houses the upper end of the coil suspension assembly, while the lower central chamber 14 of the casing contains the lower end of such suspension assembly. Formed integrally with the side walls of the chamber 14 are a pair of lugs or bracket members 15, 15 by which the casing may be attached to a support.

The magnet 12 includes a flat back plate 20 made of cold finished strip metal and carrying upon its front face a spacer bar 21 made of any suitable material such as brass. The spacer bar 21 is shorter in length than plate 20 and is positioned centrally on the latter so that the ends of plate 20 project outwardly from the ends of bar 21. The back plate 20 and the spacer bar 21 are secured to each other and to the back wall of the casing by two screws 22 and 23 and by a stud 24, the screws 22, 23 and stud 24 extending through both of such plates and terminating at their forward ends flush with the front face of the spacer bar 21. The stud 24 is a terminal post and is maintained in position by a lock nut 25. Provided on the outer rear end of stud 24 is an adjustable knob 26 by which a wire may be secured thereto. Carried by the spacer bar 21 is a rod 27 which extends along the central axis of such bar and is so located thereon that its upper end is flush with the upper edge of such bar, while its lower end projects downwardly into the chamber 14 formed in the casing. The rod 27 is made of non-magnetic stainless steel or of some other suitable material for reasons to be described presently, and is fastened to the spacer bar 21 in any suitable manner, as by brazing. As will hereinafter become more clear, the rod 27 performs a triple function in the instrument, in that it provides an accurate spacer for the magnets 28, 28, supports the lower end of the suspension assembly, and, if its material and length are chosen correctly, effects automatic temperature compensation to prevent change of tension in the suspension ribbons when the temperature of the galvanometer changes due to ambient temperature changes. The magnets 28, 28 may be of any suitable shape and extend from the rod 27 to a point slightly beyond the spacer bar 21 and are secured in position on the latter by screws 29, 29. Attached to the outer ends of the magnets 28, 28 in any suitable manner or preferably by magnetic attraction alone, are the end plates 30, 30 whose front end faces are flush with the front surfaces of the magnets 28, 28 and which extend inwardly into engagement with the projecting ends of the back plate 20. The end plates 30, 30 are not secured to the back plate 20 but merely seat against the exposed portions of the front face of the latter. The arrangement of the magnet parts 20, 21, 28 and 30 of the magnet is best shown in Fig. 5 of the drawings.

Riveted or secured in any other suitable fashion to the lower end of the rod 27 is a bracket 33 which extends forwardly from such rod in a substantially horizontal plane for approximately half its length and then inclines downwardly and forwardly so that the front portion thereof is disposed at an obtuse angle with the horizontal or rear portion thereof. Threadedly engaging with the front end of the bracket 33 is a screw 34 which serves as a binding post for connecting the lower end of a metallic ribbon 36 to such bracket. The ribbon 36 extends from screw 34 around a horizontally disposed pin 35 which is spot welded to and projects transversely outwardly from the forward end of the horizontal portion of bracket 33. The upper end of ribbon 36 is secured by means of a clip 37 to the lower end of the galvanometer coil 38. Also supported by the clip 37 is a mirror 39 positioned to be observable through the window in the cover 17 (note Fig. 1). Provided at the upper end of the galvanometer coil 38 is a clip 40 which connects the lower end of ribbon 41 to such coil. The ribbon 41 extends from clip 40 upwardly through the chamber 13 of the casing, around a pin 42 spot welded to the horizontal portion 43' of a bracket 43, and is connected at its upper end to one end of a spring 44. The other or lower end of spring 44 is connected to a screw 45 which threadedly engages the downwardly inclined outer end portion of bracket 43. Also secured to the horizontal portion 43' of bracket 43 or to some other portion of such bracket, as by soldering, is one end of a lead or a jumper 46. The other end of the jumper 46 is attached, as by soldering, to the contact lug 47' of a copper plate 47 which is secured to the back wall of the casing by means of a screw bolt 48. The shank of bolt 48 extends beyond the rear wall of the casing and functions as a terminal binding post for a lead or wire, the bolt being maintained in position on the casing by means of a lock nut 49 and being provided with a knurled knob 50 for attaching a wire to such bolt as is shown more clearly in Fig. 7 of the drawings. The plate 47 has integrally formed therewith a spring contact member or finger 51 which extends forwardly in the casing and comes into engagement with the metal cover 17 of the galvanometer.

The horizontal portion 43' of bracket 43 is suitably connected, as by soldering, to the lower end of a metal bushing 54 which is rotatably mounted in an aperture provided in the top wall of the casing chamber 13. Adjacent its upper end, the bushing 54 is provided with a flange 54' whose rim seats on the outer surface of the top wall to maintain the bushing in proper vertical position while it is being rotated without affording substantial frictional resistance to such movement. Seated on the upper end of the bushing 54 is a stainless steel ball 56 which through its engagement with the top wall of an inverted U-shaped housing 57, maintains the bushing fully seated with its flange 54' in engagement with the top wall of the casing, while reducing to a minimum any friction which might result from its engagement with the housing 57 during the rotation of the bushing. The side walls of the housing 57 are securely fastened to the upper end of the casing, as by screws. Rotational movement is imparted to the bushing 54 through a worm wheel 55 suitably secured to the upper end of such bushing and a worm thread 58 formed intermediate the ends of the shank of a lead screw 59. The worm wheel 55 is provided with teeth only along a portion of its peripheral edge, the number of teeth being predetermined to fix the rotational movement of the bushing 54 within certain limits. In the embodiment shown, there are provided about forty teeth on the worm wheel 55 to confine its rotational movement to a range of approximately 180 degrees. The shank of the lead screw 59 is rotatably supported at its ends on the side walls of the housing 57 and it is secured against unintentional movement by a spring washer 61 positioned outside the housing 57 and intermediate a flat washer and the knurled head or knob 62 of the lead screw, by which the screw is manually manipulated. A retaining ring 60 secured to the lead screw 59 coacts with the housing, the flat washer, washer 61 and knob 62 to prevent lengthwise movement of the lead screw.

The front cover 17 of the housing is stamped out at its lower portion to provide a lens housing 64 which is so formed that the observer's line of vision through the window thereof is disposed at an acute angle to the front surface of such cover. The side wall of housing 64 is provided with a plurality of dimples 65 which cooperate with a retaining ring 67 to secure a lens 66 in position in the window of the housing 64. The lens 66 is a planoconvex lens with its flat surface seated against the flange which forms the window in the housing 64. Provided at the upper portion of the cover plate 17 are a pair of adjustable stop screws 68, 68 which threadedly engage with bushings provided in such plate and extend inwardly a sufficient distance to limit the range of movement of the piece of transverse ribbon or wire 69 secured to the coil assembly by the clip 40. The stop screws 68, 68 and member 69 thus cooperate to limit the range of swing of the galvanometer coil 38. When the stop screws 68, 68 have been properly adjusted, they are maintained in their adjusted positions by means of their associated clinch or stop nuts 70, 70.

It will be seen from the foregoing detailed description of the elements which go to make up the galvanometer of this invention, that the compactness and ease of assembly of the instrument is attained in part by the construction of the magnet. The magnets 28, 28 are preferably made of one of the "Alnico" series of permanent magnet materials and especially the material known as "Alnico V." These materials create strong magnetic fields of the order of from 2,000 to 10,000 gauss and consequently make it possible to provide magnets of very small dimensions. By designing the magnets in the form of separate rectangular blocks or plates, they can be placed near the coil, thus reducing the loss of magnetic flux between the poles of each magnet. A greater concentration of flux between the pole faces of the magnets may be obtained by making them of tapered form with their narrow ends disposed in opposed relation and with their pole faces of the same area as the pole faces of the rectangular blocks. Whatever form the magnets 28, 28 may be given, their pole faces should preferably be at least as wide as the length of the coil winding 38.

The accurate positioning of the magnets both with respect to themselves and to the coil is readily attained by means of the spacing rod 27. This construction also permits the use of the magnets in the positions conventionally reserved for pole pieces, thereby providing a higher field intensity at the coil and at the same time, reducing the cost of the magnet structure. Also by constructing the magnets 28, 28 and the parts 20 and 30, 30 which form the return circuit of the magnet in the form of blocks or plates, it has been possible to reduce the overall dimensions of the magnetic circuit to a minimum without any loss of flux.

The mounting of the spacing rod 27 on the magnet assembly and the utilization thereof as one anchor point for the coil assembly also possesses the advantage that the entire magnet assembly may shift in the housing without causing too much shift in the relation of the coil 38 to the magnet. Thus, the instrument is enabled to stand relatively rough handling without being rendered inoperative. By making the rod 27 of a material having the proper coefficient of expansion and by giving it a length from the point of its attachment with bracket 33 to the lowermost point of its attachment to the spacer bar 21 so as to make up for the fact that the material of casing 10 has a coefficient of expansion with temperature change which is different from those of the metal parts of which suspension ribbons 36, 41 and coil 38 are constituted, the rod 27 will automatically prevent change of tension in the suspension ribbons 36 and 41 when the temperature of the galvanometer changes, due to ambient temperature changes. In other words, by so predetermining the rod 27, any changes in the length of the galvanometer coil assembly due to ambient temperature changes, will be compensated for by changes in the length of the downwardly projecting portion of rod 27, so that there will be substantially no change of tension in the galvanometer coil assembly.

The coil 38 is most compact and of very light weight, being composed simply of a fine wire of suitable material, such as, copper or aluminum, and formed into a very narrow elongated coil having a length at least four times or as high as thirteen or more times its width, which may be of the order of ⅛ inch, 1/16 inch or even as narrow as 1/32 of an inch. The coil 38 is supported between two clips 37 and 40 of fine wire which are also utilized to connect the coil to its suspensions 36 and 41, to support the small mirror 39 and to support the stop wire 69. Thus, the coil, its suspensions, the mirror and the stop wire are assembled with a minimum of parts which not only reduce the inertia of the coil assembly as much as possible, but reduce its cost and increase its ease of assembly. The effective lengths of the suspensions 36 and 41 are relatively short, being shorter than and not greater than the length of the coil itself. In the embodiment shown, the coil 38 which is composed of approximately one hundred turns of wire, is approximately one inch or two and one-half centimeters long and the coil assembly composed of the coil 38 and the clips 37 and 40 is approximately three and one-half centimeters long, while the lengths of the suspensions 36 and 41 are each approximately one and one-half centimeters. The suspensions are passed over the small round rods 35 and 42 and then turned back toward the center of the galvanometer. This construction has two advantages. In the first place, it makes for a shorter overall galvanometer dimension. Secondly, it permits the points at which the external lead wires are introduced to be nearer together, thus rendering the galvanometer less likely to suffer from thermoelectric effects when the instrument is subjected to temperature gradients. These effects are also greatly minimized by the construction of the casing as has been previously pointed out. In connection with the rods 35 and 42, it should also be noted that the suspensions are merely passed over the rods and no means, such as, grooves, are necessary to maintain them in position thereon. This result is attained by positioning the suspensions on the rods so that their edges engage with the side edges of the horizontal portions of the brackets 33 and 43 holding such rods and by giving the suspensions a slight angular displacement from their points of engagement with the rods to the holding screw 34 in the case of suspension 36 and to the spring 44 in the case of suspension 41. The tension of the spring 44 in this construction is thus utilized to hold the suspensions 36 and 41 against the side edges of their associated brackets, which edges thus function as stops. This can best be observed from Fig. 6 of the drawings. The use of the coiled spring in the suspension assembly results in the further advantages that its yielding nature prevents breakage of the suspension which is a common occurrence in prior constructions where adjustment is made by screws to provide proper suspension tension, and that the coiled spring may readily be snapped into place and its extension in the galvanometer assembly automatically provides the proper tension on the suspension.

The spring 44 should be sufficiently strong to provide a very taut coil assembly. In determining the amount of tension which should be applied for any suspension, it may be arrived at by providing a factor of safety of say two or more in the ratio of tensile strength of the suspension to the adopted tension. Thus, a suspension having a tensile strength of about 200 gram weight may be given a tension in the assembly of about 40 gram weight. The spring 44 may be made of any suitable metal, but it is preferred that it be constituted of beryllium copper spring material as such material possesses good soldering characteristics in addition to high tensile strength in the finer gauge wires. The spring 44 is also preferably constructed, by predetermining its gauge and the number of its turns, so that it may be employed to provide a number of tensions such as 40, 60 or 100 gram weight or even more. Thus, the same size of spring or a relatively small variety of springs of standard sizes may be employed in any number of different instruments, it being only necessary when incorporating a spring in a particular instrument to vary the length of the suspension 41 to arrive at the proper tension. Thus, this construction enables the manufacturer with standard sizes of parts to arrive at exactly the tension desired in a particular instrument without risking breaking of the suspension. This suspension also has the further advantage that the coil and suspension assembly in its entirety can be removed and replaced in the galvanometer in a few minutes. As a result of the fact that the upper end of the suspension assembly is fixed to the bushing 54 of the zero adjustment mechanism, the entire suspension assembly can be rotated as a unit so that no local deformation of the suspension can result. The zero adjustment assembly, as has been previously mentioned, is held down against the housing 10 of the galvanometer by means of the ball bearing 56 pressing against the top of the bushing 54 thereby making it possible to obtain small adjustments of the suspension without play between the adjustment screw and the rotating head or bushing 54. The worm-like adjustment screw and wheel 55 enable minute adjustments to be readily made in the instrument.

A further advantage of this instrument is attained by the electrical connection of the magnet assembly and the face plate to the lead wire connection of the coil assembly through the spacer rod 27 and the spring contact member 51. As a result of this arrangement the entire assembly may be given a change of static potential without any untoward effects or, in other words, differences of static potential between the galvanometer coil circuit, the face plate and the magnet assembly are not allowed to develop with changes of the external circuit to which the galvanometer coil is connected. Thus, in the operation of the instrument, the stop wire 69 is prevented from becoming attached to the stop screws 68 which would occur if the galvanometer coil developed a high static potential with relation to the potential of the face plate, and the coil is prevented from rotating due to differences of static potential between it and the magnet assembly.

It will be understood from the foregoing, that as the result of a very lightweight coil, short suspensions, small mirror and taut assembly in the housing, the instrument of this invention is quite stable against vibration and shock and can accordingly be used in many industrial instruments or in fields of use in which galvanometers heretofore either were not completely satisfactory or could not be used because of the vibration and shock to which they were subjected. The very lightweight and inertia of the coil and the strong magnetic field developed in this instrument provide for an exceedingly fast speed of response.

The instrument can be reliably designed to have deflection periods of the order of 0.1 or less second in applications requiring sensitivities of the order of one millimeter deflection at a distance of one meter for ten microvolts impressed across the galvanometer, and in a circuit requiring critical damping resistances of the order of a few ohms to a few hundred ohms. The stability attainable with this galvanometer in the presence of vibration together with this sensitivity were relatively unheard of in prior moving coil units and substantially widens the field of use of the galvanometer. The small size of the instrument which can be realized from the fact that Figs. 1 through 5 of the drawings are full scale drawings of the instrument, enable it to be readily incorporated with many industrial instruments to which prior galvanometers were not applicable because of their size. This reduction in size of the instrument has been attained principally by the novel construction and arrangement of the magnet and coil assemblies thereof, as has been mentioned. Another feature of this instrument is its low cost. This has been made possible by constructing the parts so as to permit wide manufacturing tolerances and ease of assembly or replacement. For example, the bars or plates which make up the magnetic return circuit, the plate to which the magnets are fastened, the rod which separates the magnets and the small round rods around which the suspensions pass, may all be cut from standard stock materials with wide cutting tolerances as the accuracy of the assembly of such parts is not determined by the accuracy in dimensions thereof, but rather by the accuracy of the fixtures in which the parts are assembled by soldering or brazing.

While we have illustrated and hereinabove described a preferred embodiment of our invention, it will be understood by those skilled in the art, that various changes and modifications thereof may be made without departing from the spirit of the invention or the scope of the appended claims.

We claim:

1. A galvanometer comprising a magnet composed of a plurality of straight, plate-like members arranged as layers into a substantially solid, rectangularly-shaped form and including a flat back plate, a spacer plate having a length less than said back plate and positioned on the latter so that the ends of said back plate extend beyond said spacer plate, a pair of spaced block-shaped magnets positioned on said spacer plate, and end plates magnetically connecting said magnets to the exposed ends of said back plate, an elongated galvanometer coil positioned intermediate said magnets and means for suspending said coil intermediate said magnets.

2. A galvanometer comprising a casing, a magnet in said casing composed of a plurality of straight, plate-like members arranged as layers into a substantially solid, rectangularly-shaped form and including a flat back plate, a spacer plate having a length less than said back plate and positioned on the latter so that the ends of said back plate extend beyond said spacer plate, means for securing said back and spacer plates to a wall of said casing, a pair of spaced magnets positioned on said spacer plate and secured to the latter, and end plates engaging the outer ends of said magnets and extending rearwardly into surface engagement with the exposed ends of said back plate, an elongated galvanometer coil positioned intermediate said magnets and means for holding said coil in suspension intermediate said magnets.

3. A galvanometer comprising a casing, a magnet in said casing composed of a plurality of straight, plate-like members arranged as layers into a substantially solid, rectangularly-shaped form and including a flat back plate, a spacer plate having a length less than said back plate and positioned on the latter so that the ends of said back plate extend beyond said spacer plate, means for securing said back and spacer plates to a wall of said casing, a pair of spaced magnets secured upon said spacer plate and capable of producing a strong magnetic field of the order of from 2,000 to 10,000 gauss therebetween, and end plates engaging the outer ends of said magnets and extending rearwardly therefrom into surface engagement with the exposed ends of said back plate, an elongated galvanometer coil of relatively light weight positioned in the magnetic field intermediate said magnets and means for tautly suspending said coil intermediate said magnets.

4. A galvanometer comprising a casing, a magnet in said casing composed of a flat back plate, a spacer plate having a length less than said back plate and positioned on the latter so that the ends of said back plate extend beyond said spacer plate, a pair of end plates removably seated on the exposed ends of said back plate and projecting forwardly therefrom beyond said spacer plate, a pair of spaced magnets secured upon said spacer plate and having their outer ends engaging with the forward ends of said end plates, a spacer member secured to and extending transversely of said spacer plate, said spacer member being located along a central axis of said spacer plate and having a width predetermining the distance between said magnets, and the opposed faces of the latter being in engagement therewith, an elongated galvanometer coil positioned over said spacer member and intermediate said magnets and means for holding said coil in suspension in such position.

5. A galvanometer comprising a casing, a magnet having a pair of spaced poles secured in said casing and a galvanometer coil assembly associated with said magnet, said assembly including a galvanometer coil positioned intermediate said poles, a pair of rods spaced from the upper and lower ends of said coil, said rods extending transversely of said coil and having a surface portion aligned with the longitudinal axis of said coil, anchoring means associated with each rod and offset from the longitudinal axis of said coil, one of said rods and its associated anchoring means being fixed in said casing and the other of said rods and its associated anchoring means mounted for adjustable movement about the longitudinal axis of said coil, a coiled spring connected at one end to one of said anchoring means, a suspension member connected to one end of said coil and to the other end of said coiled spring and intermediate its ends passing around the rod associated with the anchoring means to which said spring is connected, whereby said spring as a whole is located intermediate its associated rod and anchoring means and offset from the longitudinal axis of said suspension member and a second suspension member connected to the other end of said coil and to said other anchoring means, said second mentioned suspension member passing around the rod associated with said other anchoring means.

6. A galvanometer such as defined in claim 5 including a support secured to said magnet, said fixed rod and said other anchoring means being mounted on said support, and in which at least one of said anchoring means is spaced from said coil a distance less than its associated rod.

7. A galvanometer such as defined in claim 5, including an adjustment member rotatably mounted on a wall of said casing and means manually operable to rotate said member, said movable rod and anchoring means being mounted on said rotatable adjustment member for rotational movement as a whole about the longitudinal axes of said suspension members.

8. A galvanometer comprising a casing made of non-conducting material having good heat insulating properties, a cover plate for said casing and made of conducting material, a magnet having a pair of spaced poles secured in said casing and a galvanometer coil assembly associated with said magnet, said assembly including a galvanometer coil positioned intermediate said poles and consisting of a pair of spaced top and bottom clips and a fine wire formed into an elongated coil and supported at its ends on said clips, a suspension member connected at one end to the bottom clip and at its other end to a fixed member, a second suspension member connected at one end to the top clip, a spring coil having one end connected to the other end of said second suspension member and being disposed as a whole to one side of the longitudinal axis of such member, a zero adjustable member connected to the other end of said spring coil and supporting said coil and second suspension member, said zero adjustable member being manually movable to turn said suspension members and coil about their longitudinal axes and simultaneously to move said resilient member bodily about the longitudinal axis of said second suspension member, a lead post for said coil mounted on said non-conducting casing, a contact member mounted in said casing and electrically connected to said lead post, a lead wire connecting a movable portion of said adjustable member with said contact member, and a contact finger connected to said contact member and engaging said cover plate.

9. A galvanometer comprising a casing, a magnet having a pair of spaced poles secured in said casing, a galvanometer coil assembly including a vertically disposed coil positioned intermediate said poles, a suspension member connected at one end to the bottom end of said coil and at its other end to a fixed member, a second suspension member connected at one end to the top end of said coil, a spring coil having one end connected to the other end of said second suspension member and having its other end connected to a zero adjustment device, said zero adjustment device including a bushing rotatably mounted in the top wall of said casing, a worm wheel affixed to said bushing, a lead screw provided with a worm thread in engagement with said worm wheel, a housing secured to said casing and overlying said bushing and worm wheel, and a ball bearing seated on said bushing and engaging with a wall of said housing to hold said bushing down against the top wall of said casing.

10. A galvanometer comprising a casing, a magnet contained in said casing and including a pair of spaced pole faces arranged to provide a magnetic flux therebetween, a galvanometer coil positioned intermediate said pole faces, a pair of suspension wires connected to the ends of said coil, a bar connected to said magnet and projecting therefrom intermediate and parallel to planes containing the pole faces of said magnet, one of said suspension wires being fixed to the projecting end of said bar and means for supporting the other suspension wires under tension on a wall of said casing, said bar being made of a material having a predetermined temperature coefficient of expansion such as to compensate for changes in tension in said coil and suspension wires due to ambient temperature changes.

11. A galvanometer comprising a casing having a cross-like configuration to provide a central horizontally disposed chamber and top and bottom chambers connecting with said central chamber, a face plate having a cross-like configuration closing said casing, a magnet assembly positioned in said central chamber and including a pair of spaced magnets, a spacer bar connected to said magnet intermediate said magnets and projecting into said bottom chamber, a galvanometer coil positioned intermediate said magnets, a suspension wire connected at one end to the bottom and of said coil and connected at its other end to the projecting end of said spacer bar, an adjustable member mounted on a casing wall forming part of said top chamber, supporting means mounted on said adjustable member and contained in said top chamber, a second suspension wire connected at one end to the top end of said coil and connected at its other end to said supporting means, and means on the top of said casing for adjusting said adjustable member.

12. A galvanometer comprising a casing, a face plate made of electrically conductive material and closing said casing, a magnet contained in said casing and including a pair of spaced pole faces arranged to provide a magnetic flux therebetween, a bar made of electrically conductive material secured to said magnet, said bar having one end in engagement with both pole faces of said magnet and projecting therefrom, a galvanometer coil positioned intermediate said pole faces, a pair of suspension wires connected to the ends of said coil, one of said suspension wires being fixed to the projecting end of said bar and through the latter electrically connecting said coil to said magnet, means for supporting the other suspension wire under tension on a wall of said casing, and means for electrically connecting said other suspension wire with said face plate.

13. A galvanometer comprising a casing made of electrically non-conductive material, a face plate made of electrically conductive material for said casing, a magnet contained in said casing and constructed to provide between the pole faces thereof a relatively high magnetic field intensity, a non-magnetic, electrically conductive bar secured to said magnet so that it is in engagement with both pole faces thereof and projecting downwardly from such magnet in parallelism with such faces, a support secured to the projecting end of said bar, zero adjusting means including an adjustment member rotatably mounted in a top wall portion of said casing, a support depending from said adjustment member, a galvanometer coil having a large ratio of coil length to coil width positioned intermediate the pole faces of said magnet, a suspension wire connected at one end to said coil and at its other end to said first-mentioned support, a spring connected at one end to said depending support, a second suspension wire connected at one end to said coil and at its other end to said spring, a member on each of said supports engaging their respective suspension wire intermediate its length and rendering its effective length less than the length of said coil; and means electrically connecting said second suspension wire to said face plate.

14. In a galvanometer comprising a casing having a cross-like configuration to provide a central horizontally disposed chamber and top and bottom chambers connecting with said central chamber, a face plate having a cross-like configuration closing said casing, a magnet assembly positioned in said central chamber and including a pair of spaced magnets, a spacer bar connected to said assembly intermediate said magnets and projecting into said bottom chamber, a galvanometer coil positioned intermediate said magnets, a suspension wire connected at one end to the bottom end of said coil and connected at its other end to the projecting end of said spacer bar, a mirror connected to said suspension wire, an adjustable member on a casing wall forming part of said top chamber, supporting means mounted on said adjustable member and contained in said top chamber, a second suspension wire connected at one end to the top end of said coil and connected at its other end to said supporting means, and means at the top of said casing for adjusting said adjustable member, the combination of, a lens housing fromed on said face plate so that an observer's line of vision through the window thereof is disposed at an acute angle to the front surface of said plate, a lens in the window of said housing, a retaining ring in said housing in engagement with the back of said lens, and a plurality of projecting members formed in the wall of said housing and securing said retaining ring in position.

VOZCAN L. PARSEGIAN.
MALCOLM JOHNSON.

REFERENCES CITED

The following references are of record in the file of this patent:

UNITED STATES PATENTS

| Number | Name | Date |
|---|---|---|
| 496,500 | Weston | May 2, 1893 |
| 901,013 | Knott | Oct. 13, 1908 |
| 1,397,441 | Miller | Nov. 15, 1921 |
| 1,697,191 | Legg | Jan. 1, 1929 |
| 1,742,970 | Robinson | Jan. 7, 1930 |
| 2,169,476 | Gill et al. | Aug. 15, 1939 |
| 2,268,526 | Palmer | Dec. 30, 1941 |
| 2,309,927 | Beede | Feb. 2, 1943 |
| 2,425,408 | Williams, Jr., et al. | Aug. 12, 1947 |

FOREIGN PATENTS

| Number | Country | Date |
|---|---|---|
| 15,829 | Switzerland | Nov. 22, 1897 |
| 243,798 | Great Britain | Dec. 3, 1925 |

OTHER REFERENCES

Electrical Manufacturing, November 1944, "Permanent Magnets Have Four Major Jobs" by Charles Maynard.